United States Patent [19]

Burke

[11] Patent Number: 4,716,069

[45] Date of Patent: Dec. 29, 1987

[54] PROCESS FOR PRODUCING A PLASTIC LAMINATE OF LOW DENSITY POLYMERIC MATERIAL AND HIGH DENSITY POLYMERIC MATERIAL AND LAMINATE MADE THEREOF

[76] Inventor: Paul Burke, 45 Springhill Park, Killiney, Co. Dublin, Ireland

[21] Appl. No.: 809,475

[22] Filed: Dec. 16, 1985

[30] Foreign Application Priority Data

Dec. 17, 1984 [IE] Ireland .................. 3229/84

[51] Int. Cl.$^4$ .............................. B32B 3/28
[52] U.S. Cl. .................... 428/167; 156/205; 156/210; 156/308.2; 156/322; 428/178; 428/182; 428/213; 428/314.8; 428/319.9
[58] Field of Search ............... 156/205, 210, 555, 322, 156/308.2; 428/213, 309.9, 314.8, 318.6, 167, 178, 182, 319.9

[56] References Cited

U.S. PATENT DOCUMENTS 4,597,818 7/1986 Aoyama et al. .................. 156/308.2

FOREIGN PATENT DOCUMENTS 3341028 5/1985 Fed. Rep. of Germany ...... 428/167
1482890 8/1977 United Kingdom .
1495380 12/1977 United Kingdom .
2093403A 9/1982 United Kingdom .

Primary Examiner—Robert A. Dawson
Attorney, Agent, or Firm—Kenyon & Kenyon

[57] ABSTRACT

A process and apparatus are disclosed for producing a plastics laminate material comprising a lamina of low density foamed polymeric material such as a non-cross linked polyethylene foam and a lamina of high density non-foamed polymeric material such as high density polyethylene, wherein the low density lamina is of at least 50 times greater thickness than the high density lamina, characterised in that the individual laminae are physically bonded between nip rollers at critical conditions of elevated pressure (e.g. 40 to 50 p.s.i.) and temperature (e.g. 125° C. to 150° C.) to bring about a very strong bond such that the bonded laminae do not readily peel apart. Temperature is particularly critical and should be brought close to and not substantially above the tackifying temperature of the low density foamed material. Air is preferably entrapped between the laminae during the process. The high density lamina is preferably pre-heated to increase its malleability prior to bonding with the low density lamina. The finished laminate may be used as a protective packaging material in sheet or bag form.

15 Claims, 3 Drawing Figures

PROCESS FOR PRODUCING A PLASTIC LAMINATE OF LOW DENSITY POLYMERIC MATERIAL AND HIGH DENSITY POLYMERIC MATERIAL AND LAMINATE MADE THEREOF

FIELD OF THE INVENTION

The present invention relates to an improved process for the manufacture of laminated plastics material, in particular laminated plastics film material for use in the packaging industry.

BACKGROUND OF THE INVENTION

In the past, low density closed cell polyethylene foam, (a non-crosslinked polymer of ethylene) has been extensively used in the packaging industry as a cushioning material or as dunnage, but it has not been fully utilised as a lagging or wrapping material on account of its low shear strength. This material is ideally suited as a protective lagging material as it is totally inert, it is soft and does not scratch and it provides non-slip contact with other surfaces. For example, packaging materials having these properties are used to provide a protective lagging for high quality injection mouldings in plastics material, and electronic equipment including computer hardware, but may also be used as a general purpose packaging material for a wide range of products having a high quality finish including furniture. Corrugated paper or cardboard has been used for this purpose but suffers from many disadvantages. For example, corrugated cardboard is water-absorbent which may cause the material to disintegrate when damp, and the adhesives used to adhere the paper laminae together can cause staining. Furthermore, equivalent laminated plastics materials are currently significantly cheaper to produce than laminated paper materials.

It has been found that the strength of low-density plastics foam materials in thin film form can be greatly increased by adhering this material to a stronger high density plastics film material with the added advantage that air may be entrapped between laminae of the two different materials thus increasing its cushioning properties. For example, high density polyethylene film may be adhered to a film of low density closed cell polyethylene foam to provide a composite laminate material, preferably formed with a single layer of each material and with a certain amount of air entrapped therebetween.

The difference in density and/or composition between the two films to be laminated results in a difference in tackifying temperatures, and melting point temperatures. Thus it is difficult to achieve complete molecular fusion when heat is applied, which may be undesirable in any case as heat shrinkage and local thinning of the laminate would occur. Suitable polymeric adhesive may be used to effect a strong bond between the films but this increases costs and causes other problems in the manufacture of plastics laminates known to those in the art.

PRIOR ART

British Specification No. 1,482,890 discloses a reinforced laminate comprising a low density foamed polyethylene layer, a film of polyethylene with substantially the same tackifying temperature as the foamed layer, and a reinforcing net such as a biaxially-stretched polypropylene net sandwiched between the polyethylene layers. The layers are bonded together by passing them through nip rollers, one of which may be heated to a temperature of 88° to 121° C. which is above the tackifying temperature of the polyethylene layers. The material may be used as a non-stretch cushioning in packaging, including padded envelopes.

British Specification No. 1,495,380 discloses a film laminate wherein layers of (non-foamed) low density polyethylene film of about 2 to 3 mils (50–76 microns) thickness having the same melting point and density characteristics, are bonded together by passing them through nip rollers. One roller may be heated to a temperature of 75° C. to 125° C. using hot oil, the other roller being rubber coated. A fused bond or a peelable bond is produced depending on the temperature. Heavy duty bags and sacks can be made from this material.

British Specification No. 2,093,403A discloses a laminated sheet of polyolefin (including foamed polyethylene) adhesive-bonded to lightweight paper, wherein the paper is crimped by passing through the nip of a longitudinally-ridged roller and a resilient roller to trap air in linear pockets between the paper and plastics layers. The material can be used to manufacture a captive flap bag for fast food.

OBJECT OF THE INVENTION

The present invention seeks to provide improvements in a process for producing a plastics laminate material comprising a lamina of low density foamed polymeric material and a lamina of high density non-foamed polymeric material, characterised in that the individual laminae are physically bonded at critical conditions of elevated pressure and temperature to bring about a very strong bond such that the bonded laminae do not readily peel apart. Temperature is particularly critical and the invention is not concerned with a process wherein lamination occurs substantially above the tackifying temperature of the low density foamed material or approaching its melting point, nor is it concerned with a cold process using adhesives.

Where reference is made to a low density formed polymeric material, such is meant to indicate that the polymeric material is of low density prior to foaming. In similar manner, where reference is made to a high density non-foamed polymeric material, such is intended to indicate that the polymeric material is of high density.

SUMMARY OF THE INVENTION

According to the present invention there is provided a process for producing a plastics laminate material comprising a lamina of low density foamed polymeric material and a lamina of high density non-foamed polymeric material wherein the low density lamina is of at least 50 times greater thickness than the high density lamina, wherein the process comprises the steps of advancing the high density lamina over the low density lamina and bringing the laminae together between a pair of nip rollers under pressure, applying heat at a temperature within the range of 125° C. to 150° C. to the roller which contacts the high density lamina to bring about a strong peelable bond between the laminae, advancing the bonded laminate away from the nip rollers and allowing sufficient time for the laminate to cool to ambient temperature.

Advantageously, the process includes the step of indirectly pre-heating the high density lamina to increase its malleability with heating means upstream of the nip rollers. The heating means may comprise a hot air blower, or a source of radiant heat such as an infrared heating element.

Preferably, the pressure at the nip is within the range of 275 KPa to 552 KPa, most preferably about 345 KPa (i.e. 40 to 80 p.s.i., most preferably about 50 p.s.i.).

The preferred method of heating the roller which contacts the high density lamina is by internally circulated oil, most preferably at a temperature of about 135° C.

Apparatus for performing the process of the present invention may comprise a frame to support a first reel for holding a lamina of low density foamed polymeric material and a second reel for holding a lamina of thinner high density polymeric material, at one end of the frame, to support a pair of nip rollers intermediate the ends of the frame for bringing the laminae together under pressure and heat to form a bonded laminate, and to support a third driven reel for receiving the bonded laminate at the other end of the frame, means for supplying heat to one of said rollers which contacts the high density laminae at a temperature within the range of 125° C. to 150° C., and means for controlling said temperature, means for bringing the pair of nip rollers together under pressure within the range of 275 KPa to 552 KPa (i.e. 40 to 80 p.s.i.), and means for varying said pressure, and motive means for transmitting drive to the third reel, and means for varying the speed of advancement of the respective laminae from the first and second reels past the nip rollers to the third reel.

Preferably, the roller which contacts the high density material is profiled so as to ensure that air is entrapped between the laminae during bonding. Suitably, the roller has longitudinal or circumferential grooves to form corrugations in the high density lamina in the finished product.

Preferably, the apparatus also includes a source of indirect heat upstream of the nip rollers for pre-heating the high density lamina sufficiently to increase its malleability prior to bonding.

Suitably, a creasing eliminator is provided to remove creases in the laminae before they pass the nip rollers. Also, means to neutralize a static charge on the surfaces of the materials are suitably provided upstream of the nip rollers.

BRIEF DESCRIPTION OF THE DRAWINGS

Referring to FIG. 1, the apparatus comprises a bench 1 at one end of which is mounted a reel 2 for holding feedstock of high density polyethylene film material, for example of 10 to 20 microns thickness, preferably 12 to 15 microns thickness (i.e. about 60 gauge), and a reel 3 for holding feedstock of a film of low density closed cell non cross-linked polyethylene blown foam material, for example of 1 to 6 millimeters thickness. The films held on reels 2 and 3 may be of any suitable width or length, but are most suitably about 1500 millimeters in width. The density of the low density polyethylene material is about 16 Kg/m$^3$ (i.e. about 1 lb/ft$^3$) and its melting point is about 170° C.–180° C.

The high density polyethylene film may be plain or pigmented, for example with any suitable white pigment known in the art, and may be surface treated to facilitate printing if necessary. The feedstock may already be printed prior to being wound onto reel 2. The melting point of the high density polyethylene is about 200° C.–210° C.

Figure 1:
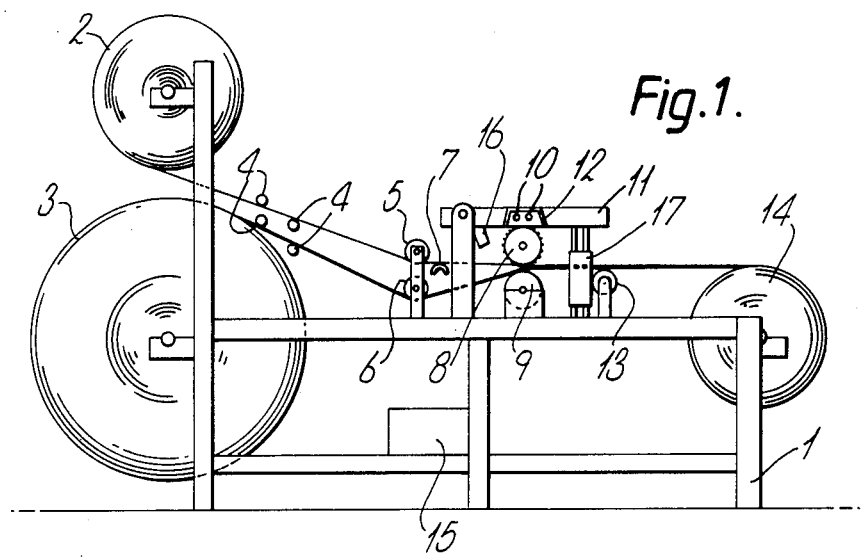
FIG. 1 is a schematic side elevation of apparatus in accordance with a first embodiment of the present invention, with tensioning rollers and drive transmission linkages omitted for clarity.

Films of the high density and low density material are firstly advanced past anti-static bars 4 of a SIMCO (Trade Mark) static eliminator which contact the surfaces of the materials to neutralize any static charge thereon caused by unwinding the material from its respective reel 2, 3. The films are then advanced past an arrangement of tensioning rollers, of which only a pair 5, 6 is shown in FIG. 1.

The film of high density material has a tendency to crease diagonally across its width and for this reason is advanced over a bow-shaped bar 7, which acts as a creasing eliminator. The two films of material are then brought together and advanced between a pair of nip rollers 8, 9 which brings the films into intimate contact under pressure.

Before entering the nip rollers, two hot air guns 16 such as LEISTER (Trade Mark) hot air blowers and heaters, direct hot air onto the upper surface of the high density film after creases have been removed by bar 7. This makes the high density film stretch slightly and increases its malleability. Indirect heat at a temperature of less than 150° C. is applied to the upper surface of pressure roller 8 by infra red heating elements 10 located directly above the roller 8, mounted on a subframe 11 and fitted with a reflector 12. The roller 8 is coated with a suitable non-stick surface such as polytetrafluoroethylene, e.g. TEFLON (Trade Mark), or may be sprayed from time to time with an aerosol containing a similar non-stick substance. The roller 8 is formed with a series of longitudinal grooves and ridges, wherein the grooves are of 3 millimeters in width and the ridges are of 2 milimeters in width, so as to apply pressure to the high density film in a series of parallel bands of 2 millimeters in width, interspaced with corrugations of 3 millimeters in width. A certain amount of air is entrapped between the two films in the corrugations as the two films are bonded together between the heated nip roller 8 and lower roller 9. The lower roller 9 is preferably covered with cork or hard rubber.

The bonded laminate is then advanced away from the nip rollers 8, 9 over a conveyor roller 13 for a certain distance, which allows time for the laminate to cool to ambient temperature and for the bond between the individual layers of high and low density film to set. The bond is not a melt fusion bond as the materials are not heated above their respective melting points during lamination. However, the bond produced is a strong physical bond wherein the individual layers can only be peeled cleanly apart upon application of a substantial force, i.e. without leaving any substantial amount of the low density polyethylene adhering to the high density polyethylene. The finished laminate is then wound onto reel 14 at the opposite end of frame 1 from reels 2, 3.

The films of high and low density material are advanced through the apparatus by means of a clutch slip drive transmitted to reel 14 by an electric motor 15 located in a lower section of the frame 1. The speed of advancement of the film material is a critical factor, and may be varied but an optimum speed for the process is approximately 10 to 25 meters per minute. Other critical factors to achieve the best results include the degree of pressure applied by rollers 8, 9 which may be adjusted by altering the gap between the rollers by relative movement of one or both of the rollers with the aid of pneumatic rams 17, which may act to pivot the roller 8 and upper frame assembly away from static roller 9, for example. The degree of heat applied to the roller 8 is also critical and may be varied by having a series of infra red elements 10 which can be independently turned on and off. If the roller 8 becomes to hot, the use of a TEFLON aerosol spray will ensure that the high density film material does not stick to the roller 8. It will be appreciated that the roller 8 is only required to apply sufficient heat to the two films of material to bring about molecular excitation which causes physical adhesion between the films and not to raise the temperature of either film to near or above its melting point which would cause molecular fusion.

Furthermore, the temperature must be carefully controlled so as to come close to, but not substantially exceed, the tackifying temperature of the low density polyethylene (about 150° C.). Thus, the combination of the heat applied indirectly to the high density film by the hot air blowers and the heat applied directly by roller 8 may bring the temperature of the high density film slightly above 150° C. during the instant at which bonding occurs at the nip.

Figure 2:
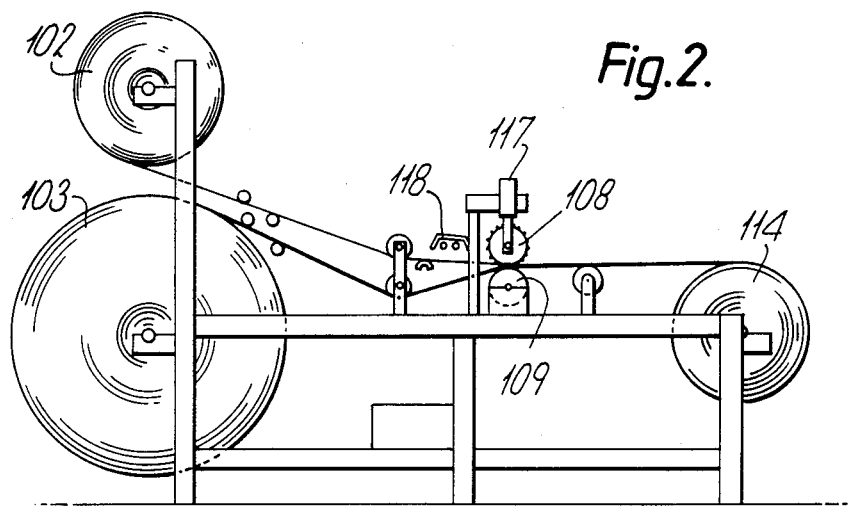
FIG. 2 is a schematic side elevation of apparatus in accordance with a second embodiment of the present invention.

FIG. 2 shows an alternative apparatus in which roller 108 is heated by means of hot oil internally circulated via a pump, such as a WORTHINGTON SIMPSON (Trade Mark) pump, from a header tank (not shown). The roller 108 may be raised and lowered with respect to roller 109 by means of independent pneumatic cylinders 117 at each side. Alternatively, the roller 108 may be raised and lowered by hydraulics. Instead of hot air blowers, the high density film may be pre-heated by indirect radiant heat supplied by infra-red heating elements 118. The temperature of roller 108 may be easily controlled by means of a thermostat regulating the oil temperature.

Figure 3:
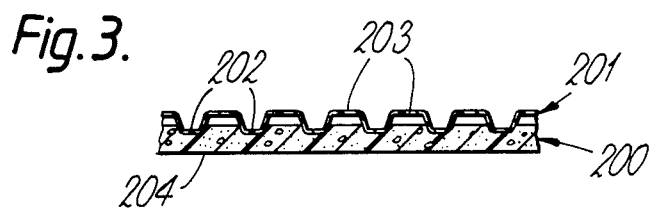
FIG. 3 is an enlarged cross-section of a plastics laminate comprising a lamina of low density polymeric material and a lamina of high density polymeric material, produced by the process of the present invention.

FIG. 3 shows a finished laminate produced by the process of the present invention comprising a lower lamina 200 of low density foamed polyethylene film material and an upper lamina 201 of thinner high density non-foamed polyethylene film material. The two laminae are bonded together along bands 202 interspaced by non-bonded air-filled corrugations 203. A second lamina of high density polyethylene film may be bonded to side 204 of the low density film to give a three-ply laminate, if desired. This is produced by bonding a two-ply laminate, (produced as described above) which is inverted and wound onto reel 3 or 103 (see FIGS. 1 or 2), with a second film of high density polyethylene film.

Alternatively, polyethylene-coated paper, foil or film, or any other strong flexible polymeric film material bondable to foamed polymeric film material, may be substituted for the high density polyethylene film material described above.

The preferred materials for use in the process of the present invention allow the or both surfaces of the finished laminate comprised by the high density polyethylene film to be printed, and a printing step may be included before the finished material is wound onto reel 14 or 114, although printing is preferably carried out before lamination. The finished laminate may be used in sheet form as a lagging for packaging purposes or may be used to manufacture packaging envelopes or bags.

I claim:

1. A process for producing a plastics laminate material comprising a lamina of foamed low density polymeric material and a lamina of non-foamed high density polymeric material wherein the low density lamina is of at least 50 times greater thickness than the high density lamina, wherein the process comprises the steps of advancing the high density lamina over the low density lamina and bringing the laminae together between a pair of nip rollers under pressure, applying heat at a temperature within the range of 125° C. to 150° C. to the roller which contacts the high density lamina to bring about a strong peelable bond between the laminae, advancing the bonded laminate away from the nip rollers and allowing sufficient time for the laminate to cool to ambient temperature.

2. A process as claimed in claim 1 including the step of indirectly pre-heating the high density lamina to increase its malleability with heating means upstream of the nip rollers.

3. A plastics laminate material comprising a lamina of foamed closed cell non cross-linked low density polyethylene peelably bonded by heat and pressure to a lamina of high density polyethylene wherein the low density polyethylene lamina is of at least 50 times greater thickness than the high density polyethylene lamina.

4. A plastics laminate material as claimed in claim 3 wherein air is entrapped between the low density polyethylene lamina and the high density polyethylene lamina.

5. A process for producing a plastic laminate material comprising the steps of advancing a first lamina of foamed low density polymeric material having a predetermined tackifying temperature and a second lamina of non-foamed high density polymeric material in overlying relation to each other;

heating the first and second laminae to a temperature sufficient to effect a physical adhesion between the laminae without substantially exceeding the tackifying temperature of the first lamina;

pressing the heated laminae together to effect bonding of the laminae together; and thereafter cooling the bonded laminae for a time sufficient to set the bond between the laminae.

6. A process as set forth in claim 5 wherein a strong physical bond is produced between the laminae characterized in that the individual lamina can only be peeled cleanly apart upon application of a substantial force.

7. A process as set forth in claim 5 wherein the first lamina is heated to a temperature of about 150° C.

8. A process as set forth in claim 7 wherein the laminae are pressed together at a pressure of from 40 to 80 psi.

9. A process as set forth in claim 5 wherein the first laminae is heated to a temperature of from 125° C. to 150° C. and the laminae are pressed together at a pressure of from 40 to 80 psi.

10. A process as set forth in claim 5 wherein the first lamina has a melting point of about 170° to 180° C. and the second lamina has a melting point of about 200° to 210° C.

11. A process as set forth in claim 5 which further comprises the step of corrugating the second lamina prior to being pressed against the first lamina to trap air therebetween.

12. A plastic laminate comprising
a first lamina of foamed low density polymeric material;
a second corrugated lamina of non-foamed high density polymeric material bonded directly to said first lamina;
said first lamina having a thickness at least fifty times greater than the thickness of said second laminae.

13. A plastic laminate as set forth in claim 12 wherein the bond between said laminae is characterized in that the individual lamina are physically adhered to each other without molecular fusion.

14. A plastic laminate as set forth in claim 12 wherein each lamina is made of polyethylene.

15. A plastic laminate as set forth in claim 12 wherein said first lamina has a melting point of from 170° C. to 180° C. and said second laminate has a melting point of from 200° C. to 210° C.

* * * * *